United States Patent
Awada et al.

(10) Patent No.: US 12,389,297 B2
(45) Date of Patent: Aug. 12, 2025

(54) CONDITIONAL HANDOVER FOR WIRELESS NETWORKS

(71) Applicant: Nokia Technologies Oy, Espoo (FI)

(72) Inventors: Ahmad Awada, Munich (DE); Ingo Viering, Munich (DE); Jedrzej Stanczak, Wroclaw (PL); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 587 days.

(21) Appl. No.: 17/774,212

(22) PCT Filed: Nov. 5, 2020

(86) PCT No.: PCT/EP2020/081131
§ 371 (c)(1),
(2) Date: May 4, 2022

(87) PCT Pub. No.: WO2021/089698
PCT Pub. Date: May 14, 2021

(65) Prior Publication Data
US 2022/0361071 A1    Nov. 10, 2022

Related U.S. Application Data

(60) Provisional application No. 62/982,730, filed on Feb. 27, 2020, provisional application No. 62/931,928, filed on Nov. 7, 2019.

(51) Int. Cl.
| H04W 36/08 | (2009.01) |
| H04W 36/00 | (2009.01) |
| H04W 36/24 | (2009.01) |

(52) U.S. Cl.
CPC ..... *H04W 36/249* (2023.05); *H04W 36/0064* (2023.05); *H04W 36/087* (2023.05)

(58) Field of Classification Search
CPC ........... H04W 36/249; H04W 36/0064; H04W 36/087; H04W 36/34; H04W 36/0005
See application file for complete search history.

(56) References Cited

U.S. PATENT DOCUMENTS

| 10,452,583 B2 * | 10/2019 | Tanaka ................ G06F 13/4282 |
| 2015/0181470 A1 * | 6/2015 | Chai ..................... H04W 36/18 455/438 |

(Continued)

OTHER PUBLICATIONS

Intel Corporation, "Email discussion report for [107#30][NR/LTE/Mob-enh] Configuration of CHO and execution condition", R2-1912779, 3GPP TSG-RAN WG2 Meeting #107bis, Oct. 14-18, 2019, Chongqing, China.

(Continued)

*Primary Examiner* — Abdullahi E Salad
(74) *Attorney, Agent, or Firm* — Lippes Mathias LLP

(57) ABSTRACT

According to an example embodiment, a method may include receiving, by a user equipment from a serving base station associated with a source cell, a reconfiguration message that includes a target cell configuration for a target cell, a configuration of a conditional handover execution condition, and information that indicates that the user equipment should immediately decode and apply the target cell configuration upon receiving the reconfiguration message; and immediately decoding and applying, by the user equipment, the target cell configuration upon receiving the reconfiguration message, without waiting for the conditional handover execution condition to be fulfilled.

17 Claims, 6 Drawing Sheets

(56) References Cited

U.S. PATENT DOCUMENTS

| | | | | |
|---|---|---|---|---|
| 2018/0049091 | A1* | 2/2018 | Wang | H04W 36/08 |
| 2019/0223073 | A1* | 7/2019 | Chen | H04W 36/0077 |
| 2020/0351744 | A1* | 11/2020 | Latheef | H04W 36/26 |
| 2021/0022057 | A1* | 1/2021 | Sabouri-Sichani | H04W 36/0079 |
| 2021/0055057 | A1* | 2/2021 | Sun | F25B 39/04 |
| 2022/0272589 | A1* | 8/2022 | Ishii | H04W 36/0038 |

OTHER PUBLICATIONS

Nokia et al., "On RRC processing and CHO command compliance check", R2-1913152, 3GPP TSG-RAN WG2 Meeting #107bis, Oct. 14-19, 2019, Chongqing, China.

China Telecom, "Running CR for introduction of even further mobility enhancement in E-UTRAN", R2-1914007, 3GPP TSG-RAN2 Meeting #107bis, Oct. 14-18, 2019, Chongqing, China.

Nokia et al., "On when to decode and non-compliance with target cell configuration", R2-1915498, 3GPP TSG-RAN WG2 Meeting #108, Nov. 18-22, 2019, Reno, USA.

* cited by examiner

CONDITIONAL HANDOVER FOR WIRELESS NETWORKS

CROSS REFERENCE TO RELATED APPLICATION

This patent application is a U.S. National Stage application of International Patent Application Number PCT/EP2020/081131 filed Nov. 5, 2020, which is hereby incorporated by reference in its entirety, and claims priority to U.S. provisional application No. 62/931,928 filed Nov. 7, 2019 and U.S. provisional application No. 62/982,730 filed Feb. 27, 2020 which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user equipment from a serving base station associated with a source cell, a reconfiguration message that includes a target cell configuration for a target cell, a configuration of a conditional handover execution condition, and information that indicates that the user equipment should immediately decode and apply the target cell configuration upon receiving the reconfiguration message; and immediately decoding and applying, by the user equipment, the target cell configuration upon receiving the reconfiguration message, without waiting for the conditional handover execution condition to be fulfilled.

According to another example embodiment, a method may include receiving, by a user equipment from a serving base station associated with a source cell, a reconfiguration message that includes a target cell configuration for a target cell, and a configuration of a conditional handover execution condition; decoding, by the user equipment, the configuration of the conditional handover execution condition upon receiving the reconfiguration message; detecting, by the user equipment, that the conditional handover execution condition has been fulfilled; applying, by the user equipment, the target cell configuration in response to the detecting that the conditional handover execution condition has been fulfilled; and wherein the user equipment ceases sending data to and receiving data from the source cell when the user equipment completes the applying of the target cell configuration.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
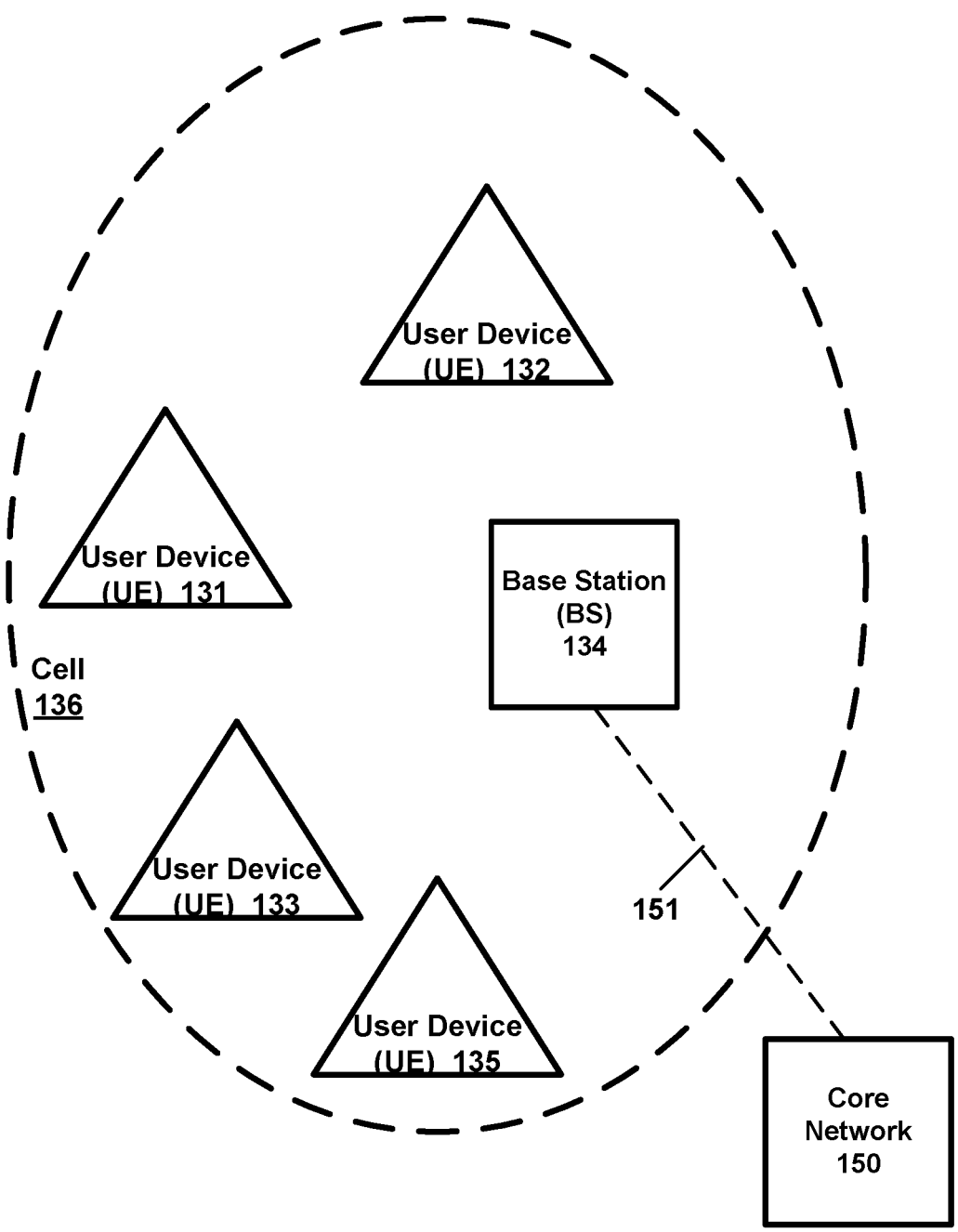
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipments (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)— related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

A handover of a user equipment (UE) may refer to a process in which a connected call or a data session for the UE is transferred from one cell (or base station) to another cell (or base station) without disconnecting the session. In some wireless technologies, such as 5G/New Radio (NR), operating at higher frequencies may create additional mobility challenges since higher diffraction losses at these higher frequencies can lead to rapid signal degradation caused by obstacles. Thus, it is desirable to provide reliable and efficient handovers to ensure UE mobility.

According to example embodiments, conditional handover (CHO) may be used to increase the mobility robustness. In an example CHO, handover preparation and handover execution may be separated. For example, in an example CHO procedure, a handover to a target cell may be prepared before-hand by a serving cell, and then the handover of the UE from the source cell to the target cell may be performed later when the radio link between the UE and the target cell is sufficient or meets a CHO execution condition. Thus, a CHO may allow the serving BS/gNB (associated with or providing the source cell that is currently serving the UE) to prepare multiple possible target cells, and then a handover may later be performed for the UE to one of the target cells. Various example embodiments are described herein for CHO procedures that may provide improved operation and/or efficiency of a UE handover, and/or may decrease a likelihood of a disconnection or service interruption for a UE during the handover.

Example Method 1

In an example embodiment of example method 1, a method for a CHO may include, for example: receiving, by a UE from a serving BS (or serving gNB) associated with a source cell, a reconfiguration message (e.g., a radio resource control (RRC) reconfiguration message) that includes a target cell configuration for a target cell, a configuration (e.g., one or more parameters) of a conditional handover (CHO) execution condition, and information that indicates that the UE should immediately decode and apply the target cell configuration upon receiving the reconfiguration message; and immediately decoding and applying, by the UE, the target cell configuration upon receiving the reconfiguration message, without waiting for the conditional handover execution condition to be fulfilled.

For example, the immediately decoding and applying the target cell configuration upon receiving the reconfiguration message may refer to or may include the UE decoding and applying the target cell configuration in response to receiving the reconfiguration message, and without waiting (or delaying) for the conditional handover execution condition (e.g., or without waiting for other condition) to be fulfilled with respect to the target cell. In an illustrative example embodiment, the UE may decode the reconfiguration message (including decoding the target cell configuration, the configuration of the CHO execution condition, and other information within the reconfiguration message) immediately or in response to receiving the reconfiguration message. Decoding may refer to or may include the UE evaluating bits or fields within the reconfiguration message to determine a meaning of the bits or of the one or more fields of the reconfiguration message.

In an example embodiment, the target cell configuration may be received by the source cell from the target cell. The target cell configuration may include a configuration or parameter(s) of the target cell that may be used by the UE, for example, to prepare a UE configuration, such as to prepare a protocol stack instance for the UE to use for communication with the target cell. Thus, in an example embodiment, the UE applying or processing the target cell configuration may include the UE configuring one or more communication parameters, such as preparing a protocol stack instance, to be used for communication with the target cell, based on the target cell configuration. In an example embodiment, the UE may support preparing and/or use of multiple protocol stack instances, e.g., such as a UE using a first protocol stack instance for communication with a source cell (based on a source cell configuration of the source cell), and also the UE preparing a second protocol stack instance for communication with a target cell (e.g., based on the target cell configuration for the target cell). The UE may use the second protocol stack instance (based on the target cell configuration) for communication with the target cell after a handover is performed for the UE from the source cell to the target cell.

A protocol stack instance may include multiple protocol layers, for example. In an example embodiment, the UE may prepare a protocol stack instance based on the target cell configuration, and may include, for example, a protocol stack instance for one or more protocols or protocol layers that may be used by the UE to communicate with the target cell, such as a PHY (physical) layer, a MAC (medium access control) layer, an RLC (radio link control) layer, and/or a PDCP (packet data convergence protocol) layer, for example. By way of illustrative example, the target cell configuration may provide configuration information (e.g., such as one or more parameters) for, e.g., configuration of the MAC layer (e.g., such as to configure a random access (RACH) procedure for the target cell), for configuration of the PDCP layer (e.g., such as to configure or indicate a configuration of a security algorithm and/or header compression for the target cell). These are merely some illustrative examples.

According to an example embodiment, a configuration of the conditional handover (CHO) execution condition for the target cell may include one or more parameters that may define or may be used by the UE to determine the CHO execution condition. For example, the CHO execution condition may define the cell measurement conditions (or a relationship of the source cell measurement and target cell measurement) among the source cell and the target cell that will trigger or cause the UE to perform the handover to the target cell (e.g., if such CHO execution condition is fulfilled or satisfied for a minimum time period referred to as Time-to-Trigger (TTT)). For example, the UE may, from time to time, perform signal measurements of signals received from the source cell, and one or more neighbour (or potential target) cells. The measurements by the UE may include, measuring a reference signal receive power (RSRP), a reference signal received quality (RSRQ), or other signal measurement. For example, the CHO execution condition may indicate that the target cell measurement should be better (e.g., greater than) the source cell measurement by more than an indicated threshold or offset(s). For example, the CHO execution condition may be configured (or indicated to the UE) by the source node (source BS/gNB) in the reconfiguration message (e.g., in a radio resource control (RRC) Reconfiguration message) that may be sent by the source BS (source node) to the UE.

As an illustrative example, e.g., for intra-frequency handover, for instance, a similar condition to that of A3 measurement event may be configured as an example CHO execution condition. For instance, CHO execution for the UE may be triggered if the condition below (indicated by Eqn. 1) is fulfilled for a certain Time-to-Trigger (TTT), where TTT may refer to a minimum time period that the CHO execution condition must be fulfilled or met to trigger or cause the handover of the UE to the target cell:

$$Mn+Ofn+Ocn-Hys>Mp+Ofp+Ocp+Off \qquad \text{(Eqn. 1)}$$

where Mn is the measurement of the neighboring target cell of handover, Mp is the measurement of the serving cell, Ocn is the cell individual offset (CIO). The parameters Ofn, Ofp, Ocp, Off and Hys are other offsets that may be configured by the network (and which may be indicated in the configuration of conditional handover execution condition). The CIO (shown as Ocn in Eqn. 1) may be an offset that may be applied specifically to a neighbor cell measurements (and may be specific to this target/neighbor cell), to make such neighbor cell measurements more attractive for a UE handover (e.g., via a positive CIO), or less attractive for a UE handover (e.g., via a negative CIO). Thus, a target cell configuration that includes or indicates a large positive CIO value may, for example, make it much more likely that such CHO execution condition will be met or fulfilled by the UE for the target cell, while a target cell configuration having or indicating a negative CIO makes it less likely that such CHO execution condition will be fulfilled or met by the UE for the target cell.

As noted above for the example method 1, the reconfiguration message received by the UE from the serving BS (or serving gNB/node) associated with the source cell may indicate that the UE should immediately decode and apply (or process) the target cell configuration upon (or in response to) receiving the reconfiguration message (e.g., RRC reconfiguration). In illustrative examples, the reconfiguration message may explicitly or implicitly indicate that the UE should immediately decode and apply (or process) the target cell configuration upon (or in response to) receiving the reconfiguration message.

For example, the information, included in the reconfiguration message, that explicitly indicates that the UE should immediately decode and apply the target cell configuration may include a flag or other explicit indication that indicates that the UE should (or instructs the UE to) immediately decode and apply the target cell configuration upon receiving the reconfiguration message and without waiting for the conditional handover execution condition to be fulfilled with respect to the target cell.

In an example embodiment, the information, included in the reconfiguration message, that implicitly indicates that the user equipment should immediately decode and apply the target cell configuration may include one or more fields or parameters (e.g., offsets, CIO, or other parameters, see Eqn. 1 by way of illustrative example) of the configuration of the CHO execution condition that causes the user equipment to immediately decode and apply the target cell configuration upon receiving the reconfiguration message, and without waiting for the conditional handover execution condition to be fulfilled with respect to the target cell. As an illustrative example, the CIO (Ocn) of Eqn. 1 may be provided to the UE as a parameter of the configuration of the CHO execution condition for the target cell. If the CIO (Ocn in Eqn. 1) is set to a sufficiently high value (e.g., a very high value, such as +24 dBm), this will ensure that the CHO execution condition will be immediately fulfilled. Now, if a non-zero TTT value is specified (e.g., within the reconfiguration message or other message or system information) for this target cell, then the CHO execution condition (e.g., condition as indicated by example of Eqn. 1) for the target cell must be fulfilled or satisfied for a minimum time period of TTT, before a UE handover to the target cell is triggered.

According to an example embodiment, after the CHO execution condition has been met for a TTT time period, this triggers the handover of the UE from the source cell to the target cell, where the handover of the UE may include the UE detaching from the source cell (e.g., the UE stops receiving and/or decoding signals from the source cell, stops receiving or acquiring synchronization signals from the source cell, and/or stops transmitting data to and/or receiving data from the source cell). According to an example embodiment, the UE, as part of the handover to the target cell after detaching from the source cell, may then perform layer 1/layer 2 (L1/L2) synchronization to the target cell, e.g., by receiving primary synchronization signals (PSS) and/or secondary synchronization signals (SSS) from the target cell (e.g., to obtain frame timing information for the target cell, and other information), and then performs a random access procedure with the target cell (e.g., where the synchronization and/or random access procedure performed by UE with respect to the target cell may be performed based on or using the prepared protocol stack instance that was previously prepared by the UE based on the target cell configuration).

According to an example embodiment, to avoid or reduce the probability of a service interruption, the UE may perform the following during at least a portion of time when the UE is decoding and/or applying the target cell configuration: evaluating whether the CHO execution condition has been fulfilled; and/or receiving data from and/or sending data to the serving BS/node. Thus, in an illustrative example, the UE may continue evaluating the CHO execution condition (to determine if such condition has been fulfilled with respect to the target cell) and continuing to send data or signals to and/or receive data or signals from the source cell may be performed while, or within a same time period (or even in parallel) with the UE decoding (e.g., decoding at least the target cell configuration) and applying (e.g., preparing a protocol stack instance for communication with the target cell based on the target cell configuration) of the target cell configuration. In this manner, the UE continue its data service via the source cell, while making preparations (in advance) for the communication with the target cell (e.g., by the UE decoding at least the target cell configuration, and then applying the target cell configuration/preparing a protocol stack instance for the target cell). Thus, for example, the transmitting of data/signals to and from the source cell may continue until the UE detaches from the source cell, wherein such source cell detachment may, for example, be performed when the CHO execution condition has been fulfilled for the TTT time period. Thus, in an example embodiment, in the case of a non-zero TTT, the fulfillment of the CHO execution condition may require that the target cell measurement is sufficient (e.g., meeting the condition of Eqn. 1, or other condition) for at least TTT time period.

According to an example embodiment, at least in some cases, the UE may not necessarily be able to continue transmitting data or signals to and/or receive data or signals from the source cell, while at the same time, receiving synchronization signals (e.g., receiving primary synchronization signals and/or secondary synchronization signals) from the target cell. Thus, in such case, the UE will need to first detach from the source cell before performing synchronization and/or random access with respect to the target cell. In an example embodiment, the TTT value may be set to a non-zero value that is long enough to allow the UE to complete the decoding and applying the target cell configuration, before the TTT period expires, causing the UE to detach from the source cell. Thus, a sufficiently long TTT may allow the UE to continue communications or its connection with the source cell while the UE decodes and applies the target cell configuration. Thus, according to an example embodiment, the configuration of the conditional handover execution condition (with respect to handover to the target cell) may include a Time-To-Trigger (TTT) value that is (at least) long enough to allow a sufficient time period for the UE to decode and apply the target cell configuration before the conditional handover execution condition is fulfilled (and, thus, before the detachment of the UE from the source cell occurs, according to this example embodiment).

Thus, according to an illustrative example embodiment of method 1, the reconfiguration message received by the UE may indicate (e.g., either explicitly via a specific field for this purpose, or implicitly by including values of one or more parameters of the target cell configuration) that indicates the UE should (or instructs the UE to) immediately decode and apply/process the target cell configuration. Thus, the UE may immediately (e.g., in response to receiving the reconfiguration message, without waiting for fulfillment of the CHO execution condition or other condition) decode (e.g., decode the reconfiguration message including the target cell configuration) and apply the target cell configuration. Thus, in this manner, according to an example embodiment, to avoid or at least reduce a service interruption due to a handover to the target cell, the UE may perform multiple activities up until the CHO execution condition is fulfilled (for TTT), including: decoding and applying the target cell configuration, evaluating whether the CHO execution condition for the target cell has been fulfilled (e.g., for at least TTT time period), and (e.g., continuing to) transmit and/or receive data or signals to and/or from the source cell (e.g., so as the UE will continue the connection and/or wireless service via the source cell, while the UE makes early preparations for the handover execution to the target cell).

Figure 2:
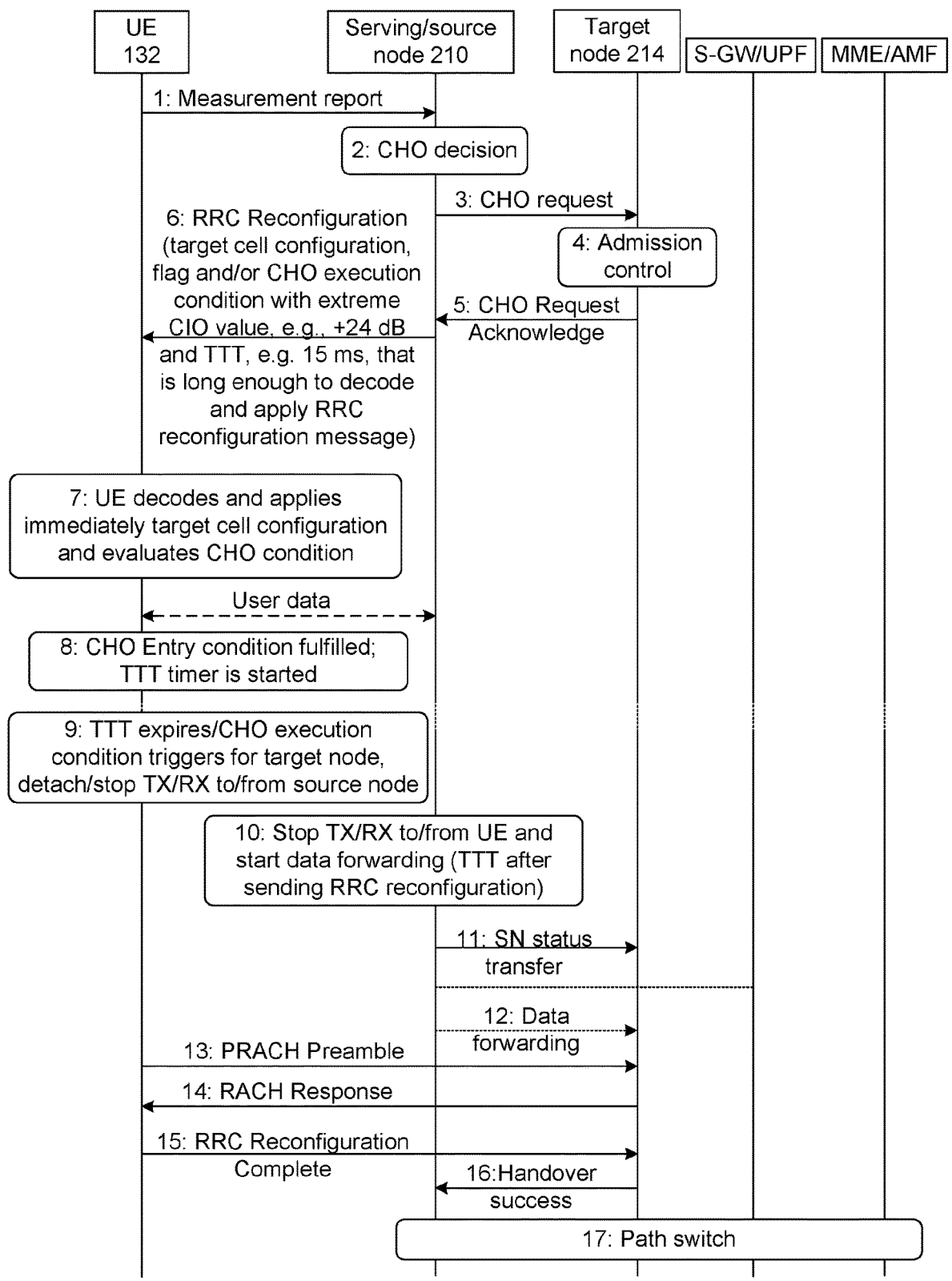
FIG. 2 is a signal diagram illustrating operation of a first method (method 1) according to an example embodiment.

FIG. 2 is a signal diagram illustrating operation of method 1 according to an example embodiment. As shown in FIG. 2, a UE 132, a serving node 210 (e.g., serving BS) that is associated with a source cell, and a target node 214 associated with a target cell are shown. Also, core network entities are also shown, e.g., including a serving gateway/user plane function (S-GW/UPF), and a Mobility Management Entity/Access and Mobility Management Function (MME/AMF) function are shown. Operations 1-17 are shown in the diagram of FIG. 2. At 1, a measurement report(s) is sent to the serving node 210, e.g., indicating RSRP (or other signal measurements) for the source cell and one or more target cells, e.g., to allow the serving node 210 to determine one or more possible target cells for possible handover for the UE. At 2, the serving node 210 may make a CHO decision, e.g., to perform a conditional handover of the UE to one or more (possible) target cells. At 3, a CHO request is sent to a target node 214 that is associated with the target cell. At 4, target node 214 performs admission control to make a decision to accept the requested handover of the UE 132. At 5, the target node 214 sends a CHO request acknowledge, accepting or acknowledging the requested CHO for UE 132 to the target cell, and providing a target cell configuration for the target cell.

At 6 of FIG. 2, the UE receives a reconfiguration message (e.g., a RRC reconfiguration), which may include, e.g., the target cell configuration for the target cell, a configuration of a CHO execution condition, and information that may indicate that the UE should immediately decode and apply the target cell configuration. The information indicating that the UE should immediately decode and apply the target cell configuration may be provided as explicit information (e.g., a specific flag or field that indicates this), or one or more fields (e.g., offsets, CIO, TTT, or other parameter) of the CHO execution condition for the target cell that will cause the UE to immediately decode and apply the target cell configuration. In an illustrative example, the information (indicating that the UE should immediately decode and apply) may include a high or large CIO value, e.g., +24 dB (to ensure that the entry condition (e.g., condition of Eqn. 1) of the CHO execution condition will (definitely) be satisfied or met, and/or a TTT of a sufficient length (at least long enough) to provide a time period for the UE to decode and apply the target cell configuration.

At 7 of FIG. 2, the UE decodes the reconfiguration message (including decoding the target cell configuration, the CHO execution condition, and other information) and (then, immediately) applies (e.g., processes) the target cell configuration (e.g., UE making preparations for the target cell handover, such as by preparing a protocol stack instance based on the target cell configuration). Also, at 7, in parallel, or within a same period of time as the immediately decoding and applying the target cell configuration, the UE may evaluate the CHO execution condition (e.g., measurements from source and target cells, and with respect to CIO and for time period TTT). Also, while these two operations may be performed by the UE (e.g., decode and apply target cell configuration, and evaluate the CHO execution condition), the UE may also continue to send and/or receive user data with respect to the source cell.

At 8 of FIG. 2, the UE determines that a CHO entry condition (e.g., condition of Eqn. 1 is met for target cell, based on cell measurements and CIO/Ocn), and TTT timer is started. At 9, the TTT timer expires (while CHO entry condition is still met), meaning that the CHO execution is now fulfilled or met for target cell, triggering the UE to detach from source node (and thus, stop transmitting data to and/or receiving data from the source cell). In an example embodiment, the TTT value may be at least as large as the amount of time required by the UE to decode and apply the target cell configuration, e.g., such that source cell detachment will not be performed by UE before the UE has completed the decoding and applying of the target cell configuration, for example. At 10, (e.g., TTT after sending reconfiguration message), the serving node 210/source cell stops transmitting data to and receiving data from the UE 132 and begins forwarding DL data for the UE to the target node 214. The DL data forwarded by source node 210 to the target node 214 may include DL (downlink) data transmitted by the source node 210 to the UE 132 but not acknowledged by the UE, and any newly received DL data (from the core network) that has been received by the source node 210 but not yet transmitted to the UE 132. At 11, 12, data forwarding is performed, including a sequence number status transfer at 11, and a data forwarding at 12. In an example embodiment, the source cell initiates data forwarding immediately after stopping reception and transmission with the UE. Moreover, the source cell sends to the target cell of handover "SN Status Transfer" message defining the next missing PDCP COUNT values for DL and UL, i.e., the next missing packet that the target cell should send in DL or receive in UL.

After that, the UE may perform synchronization with the target node/target cell (e.g., receive PSS and SSS from target node/target cell), and then perform random access with the target node/target cell to establish a connection with the target node/target cell, including sending a RACH (random access) preamble at 13, and receiving a random access (RACH) response at 14. Once the UE has established a connection to the target node/target cell, at 15, the UE 132 sends an RRC reconfiguration complete message/indication to the target node/target cell, and the target node at 16 replies to the serving node/source cell with a handover success indication, and a path switch for the UE traffic is performed at 17 between the core network and the source and target nodes.

In an example of method 1 (e.g., shown in FIG. 2) the network includes in the reconfiguration message (e.g., RRC Reconfiguration) (containing CHO command or CHO execution condition, step 9 in FIG. 2) an indication for the UE such that it decodes immediately the target cell configuration and the CHO execution condition, and also immediately applies the decoded target cell configuration (e.g., causing the UE to prepare a protocol stack instance, and/or configure one or more communication parameters of the UE, for communication with target cell based on the target cell configuration). The indication can be implicit by configuring one of the parameters (e.g., Cell Individual Offset, CIO, or other offset or other parameter), such as by controlling the CIO to a specific extreme value (e.g., by setting the CIO value to a high or even a maximum value, which is currently +24 dB), which may cause the CHO execution condition to be met, where the CIO may be set to bias measurements of neighbour, and in this case to cause the CHO execution condition for TTT time period to be fulfilled or expire for this neighbour/target cell.

Thus, for example, RRC reconfiguration may include an implicit or explicit indication that the UE should decode and apply target cell configuration immediately (e.g., upon reception of the message)—where UE may decode everything in RRC reconfiguration, including target cell configuration, without waiting for CHO condition to be met, e.g., so that UE may perform multiple things in parallel or multiple things between receipt of RRC reconfiguration and detachment: 1) decodes and processes/applies the target cell configuration 2) monitors for the fulfillment of CHO execution condition, and 3) while the UE transmits and receives data with source node. In another embodiment, the RRC Reconfiguration containing the target cell configuration and CHO execution condition can contain an explicit indication (a flag or Boolean) for (or instructing/causing) the UE to decode and process immediately the entire RRC Reconfiguration (including CHO execution condition and the target cell configuration) while waiting for the CHO execution condition to trigger.

Upon receiving the indication provided within the RRC reconfiguration, the UE immediately decodes the target cell configuration and the CHO execution condition and applies the target cell configuration. The UE starts evaluating the CHO execution condition. Once the CHO execution condition is fulfilled, the UE performs random access to the target cell as in CHO.

With this enhancement, the base station can configure extremely early CHO execution condition (which guarantees that the CHO entry condition of the CHO execution event is fulfilled immediately) and a TTT which is long enough to allow the UE to decode and/or apply the target cell configuration.

If the indication (either explicit indication or implicit indication) is not present, the UE then applies the target cell configuration when the CHO execution condition is fulfilled and it is left for the UE implementation when to decode the target cell configuration received in the reconfiguration message. In one implementation, the UE may decode the target cell configuration only when the CHO execution condition is fulfilled for that target cell.

Example Method 2

The example method 2 may be the same and/or similar in many respects to the method 1 (e.g., an example of method 1 is shown in FIG. 2), and may use the same terms and definition of terms as method 1. The differences between method 2 and method 1 will be described here under method 2.

According to an example embodiment of method 2, a method may include receiving, by a UE from a serving BS associated with a source cell, a reconfiguration message (e.g., RRC reconfiguration) that includes a target cell configuration for a target cell, and a configuration of a conditional handover execution condition; decoding, by the UE, the configuration of the conditional handover execution condition upon receiving the reconfiguration message (note that, in method 2, the applying of the target cell configuration is delayed until CHO execution condition is fulfilled or triggered); detecting, by the UE, that the conditional handover execution condition has been fulfilled; applying, by the user equipment, the target cell configuration in response to the detecting that the conditional handover execution condition has been fulfilled; and wherein the user equipment ceases sending data to and receiving data from the source cell when the user equipment completes the applying the target cell configuration. The method may further include the UE receiving data from or sending data to the serving base station until the UE completes the applying of the target cell configuration.

Figure 3:
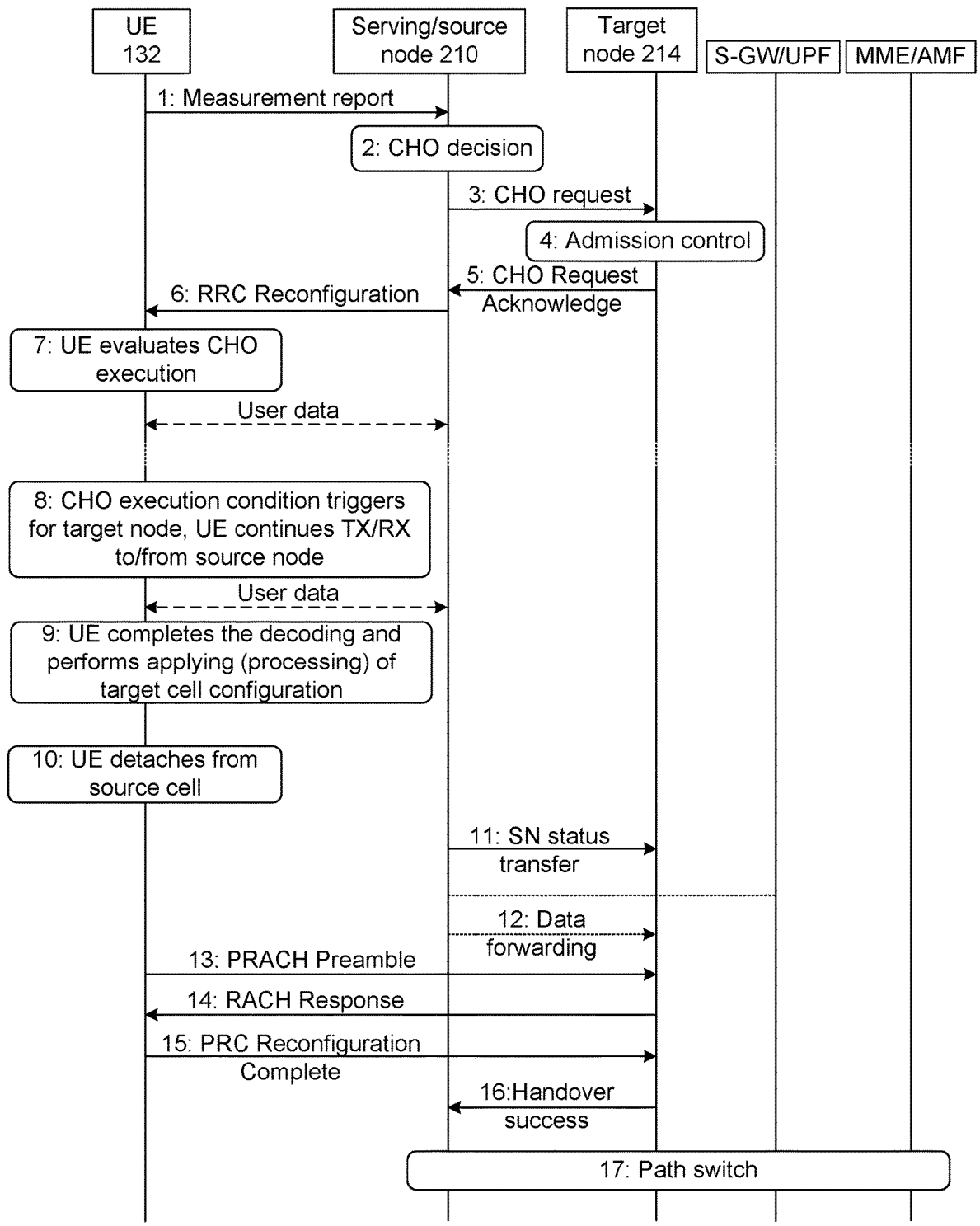
FIG. 3 is a signal diagram illustrating operation of a second method (method 2) according to an example embodiment.

FIG. 3 is a signal diagram illustrating operation of method 2 according to an example embodiment. The operations 1-5 and 11-17 of the example shown in FIG. 3 may be the same or similar to those same operations shown in FIG. 2. Operations 6-10 of FIG. 3 will be described.

Referring to FIG. 3, at 6, the UE may receive from a serving node/BS associated with a source cell, a reconfiguration message, e.g., a RRC reconfiguration, that includes a target cell configuration for a target cell, and a configuration of a conditional handover execution condition (note that the indication provided as part of the reconfiguration message of FIG. 2/method 1 to cause UE to immediately decode and apply target cell configuration is not provided in RRC reconfiguration of method 2/FIG. 3). Thus, at 6, the UE receives RRC Reconfiguration containing the source cell configuration (e.g., which may update one or more configuration parameters with respect to the source cell) and target cell configuration, and CHO execution condition.

At 7 of FIG. 3, UE decodes first the CHO execution condition that is part of RRC Reconfiguration message (and may also decode the source cell configuration, but UE applying target cell configuration is not started until CHO execution condition is fulfilled). Also, at 7 of FIG. 3, the UE evaluates the CHO execution condition, and may continue to transmit and receive data with the source cell. At 8, if CHO execution condition is fulfilled, the UE decodes and applies the target cell reconfiguration and continues to transmit and receive with source cell until the target cell reconfiguration decoding is complete (e.g., which may take ~10-20 ms). Thus, for example, for method 2 and/or FIG. 3, the decoding and applying are performed before the UE detaches from the source cell. The UE applying the target cell configuration is not performed until CHO execution condition is fulfilled for target cell.

At 9 of FIG. 3, in response to the UE detecting that the CHO execution condition has been fulfilled, the UE completes decoding of the target cell configuration and begins applying of the target cell configuration. Thus, in method 2, applying of the target cell configuration is delayed until the CHO execution condition has been fulfilled. The target cell configuration may be decoded either before or after CHO execution condition has been fulfilled. Thus, at 9, after the CHO execution condition is fulfilled for the target cell, the UE completes decoding of the target cell configuration, and performs applying, of the target cell configuration, while continuing to transmit and receive data with respect to the source cell.

At 10 of FIG. 3, after the UE completes the applying of the target cell configuration, the UE detaches from the source cell, and ceases transmitting data to and/or receiving data from the source cell. Once CHO condition is met, UE starts decoding and applying target cell configuration while continuing to TX/RX with source cell. However, for example, the UE does not detach from source cell until decoding and applying of the target cell configuration is completed. After detaching from the source cell, the UE may perform synchronization with the target cell, and then random access with the target cell.

Figure 4:
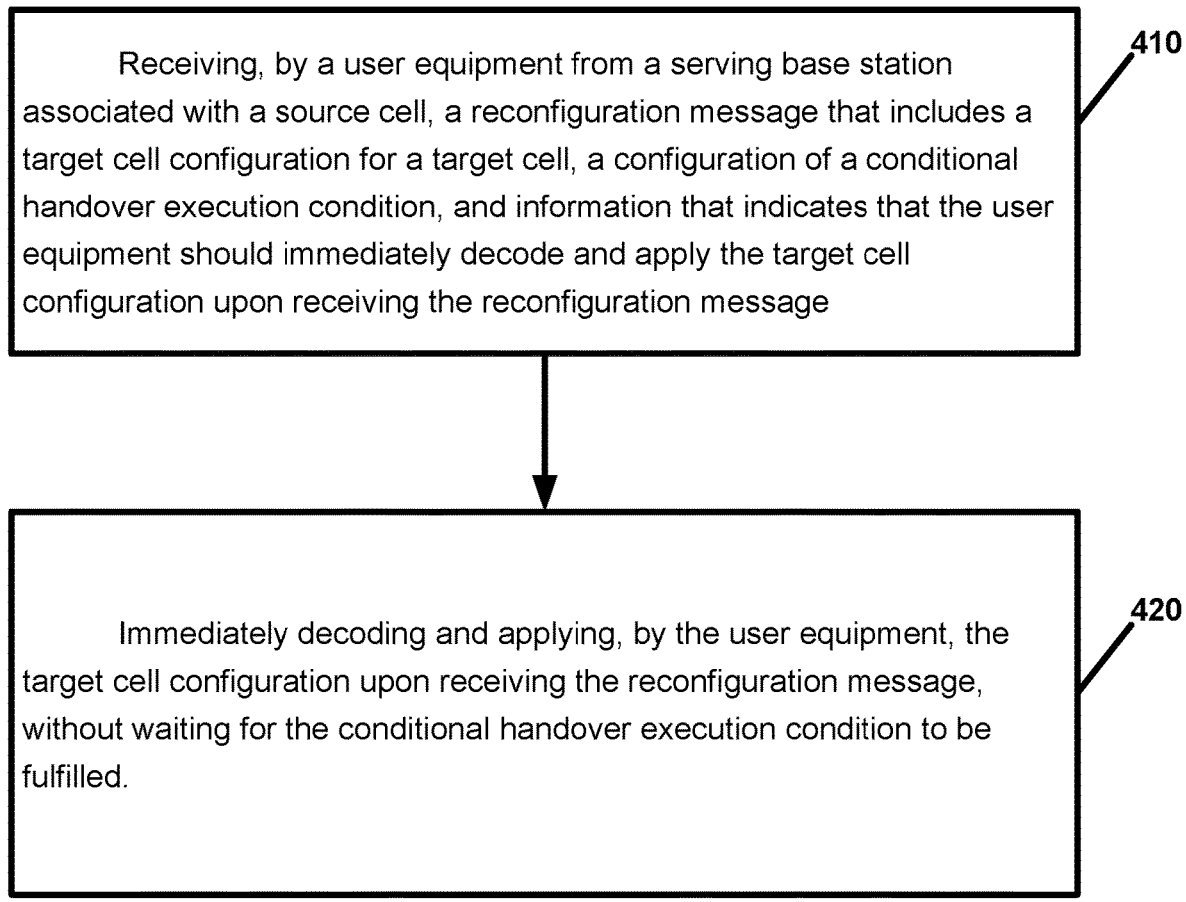
FIG. 4 is a flow chart illustrating operation of a user device/user equipment according to an example embodiment.

Example 1. FIG. 4 is a flow chart illustrating operation of a user equipment (UE) according to an example embodiment. Operation 410 includes receiving, by a user equipment from a serving base station associated with a source cell, a reconfiguration message that includes a target cell configuration for a target cell, a configuration of a conditional handover execution condition, and information that indicates that the user equipment should immediately decode and apply the target cell configuration upon receiving the reconfiguration message. And, operation 420 includes immediately decoding and applying, by the user equipment, the target cell configuration upon receiving the reconfiguration message, without waiting for the conditional handover execution condition to be fulfilled.

Example 2. The method of Example 1, wherein the applying of the target cell configuration comprises at least: preparing, by the user equipment based on the target cell configuration, a protocol stack instance for the user equipment to use for communication with the target cell.

Example 3. The method of any of Examples 1-2, further comprising performing the following during at least a portion of a time period when the UE performs the immediate decoding and applying of the target cell configuration: evaluating whether the conditional handover execution condition has been fulfilled.

Example 4. The method of any of Examples 1-3, further comprising performing the following during at least a portion of a time period when the UE performs the immediate decoding and applying of the target cell configuration: receiving data from or sending data to the serving base station.

Example 5. The method of any of Examples 1-4, comprising receiving data from or sending data to the serving base station until the conditional handover execution condition has been fulfilled.

Example 6. The method of any of Examples 1-5, wherein the information, included in the reconfiguration message, that indicates that the user equipment should immediately decode and apply the target cell configuration comprises: a flag or other explicit indication that the user equipment should immediately decode and apply the target cell configuration upon receiving the reconfiguration message and without waiting for the conditional handover execution condition to be fulfilled with respect to the target cell.

Example 7. The method of any of Examples 1-6, wherein the information, included in the reconfiguration message, that indicates that the user equipment should immediately decode and apply the target cell configuration comprises: an implicit indication that the user equipment should immediately decode and apply the target cell configuration without waiting for the conditional handover execution condition to be fulfilled.

Example 8. The method of Example 7 wherein the implicit indication comprises: one or more fields or parameters of the configuration of the conditional handover execution condition that causes the user equipment to perform the immediate decoding and applying of the target cell configuration upon receiving the reconfiguration message, and without waiting for the conditional handover execution condition to be fulfilled with respect to the target cell.

Example 9. The method of any of Examples 7-8 wherein the implicit indication comprises: a cell individual offset, or other offset, set to a value that causes the user equipment to perform the immediate decoding and applying of the target cell configuration upon receiving the reconfiguration message.

Example 10. The method of any of Examples 1-9 wherein the configuration of the conditional handover execution condition comprises a Time-To-Trigger (TTT) value that is long enough to allow a sufficient time period for the user equipment to decode and apply the target cell configuration before the conditional handover execution condition is fulfilled.

Example 11. The method of any of Examples 1-10, and further comprising: detecting fulfillment of the conditional handover execution condition with respect to the target cell; and performing, by the user equipment, synchronization and a random access procedure with respect to the target cell, in response to detecting the fulfillment of the conditional handover execution condition.

Example 12. The method of any of Examples 1-11, further comprising: omitting a transmission, or not sending, by the user equipment, of a reconfiguration complete (e.g., RRC Reconfiguration Complete) as a response to the reconfiguration message when receiving a reconfiguration message that includes information that indicates that the user equipment should immediately decode and apply the target cell configuration upon receiving the reconfiguration message.

Example 13. An apparatus comprising means for performing the method of any of Examples 1-12.

Example 14. A non-transitory computer-readable storage medium comprising instructions stored thereon that, when executed by at least one processor, are configured to cause a computing system to perform the method of any of Examples 1-12.

Example 15. An apparatus comprising: at least one processor; and at least one memory including computer program code; the at least one memory and the computer program code configured to, with the at least one processor, cause the apparatus at least to perform the method of any of Examples 1-12.

Example 16. An apparatus comprising: at least one processor; and at least one memory including computer program code; the at least one memory and the computer program code configured to, with the at least one processor, cause the apparatus at least to: receive, by a user equipment from a serving base station associated with a source cell, a reconfiguration message that includes a target cell configuration for a target cell, a configuration of a conditional handover execution condition, and information that indicates that the user equipment should immediately decode and apply the target cell configuration upon receiving the reconfiguration message; and immediately decode and apply, by the user equipment, the target cell configuration upon receiving the reconfiguration message, without waiting for the conditional handover execution condition to be fulfilled.

Figure 5:
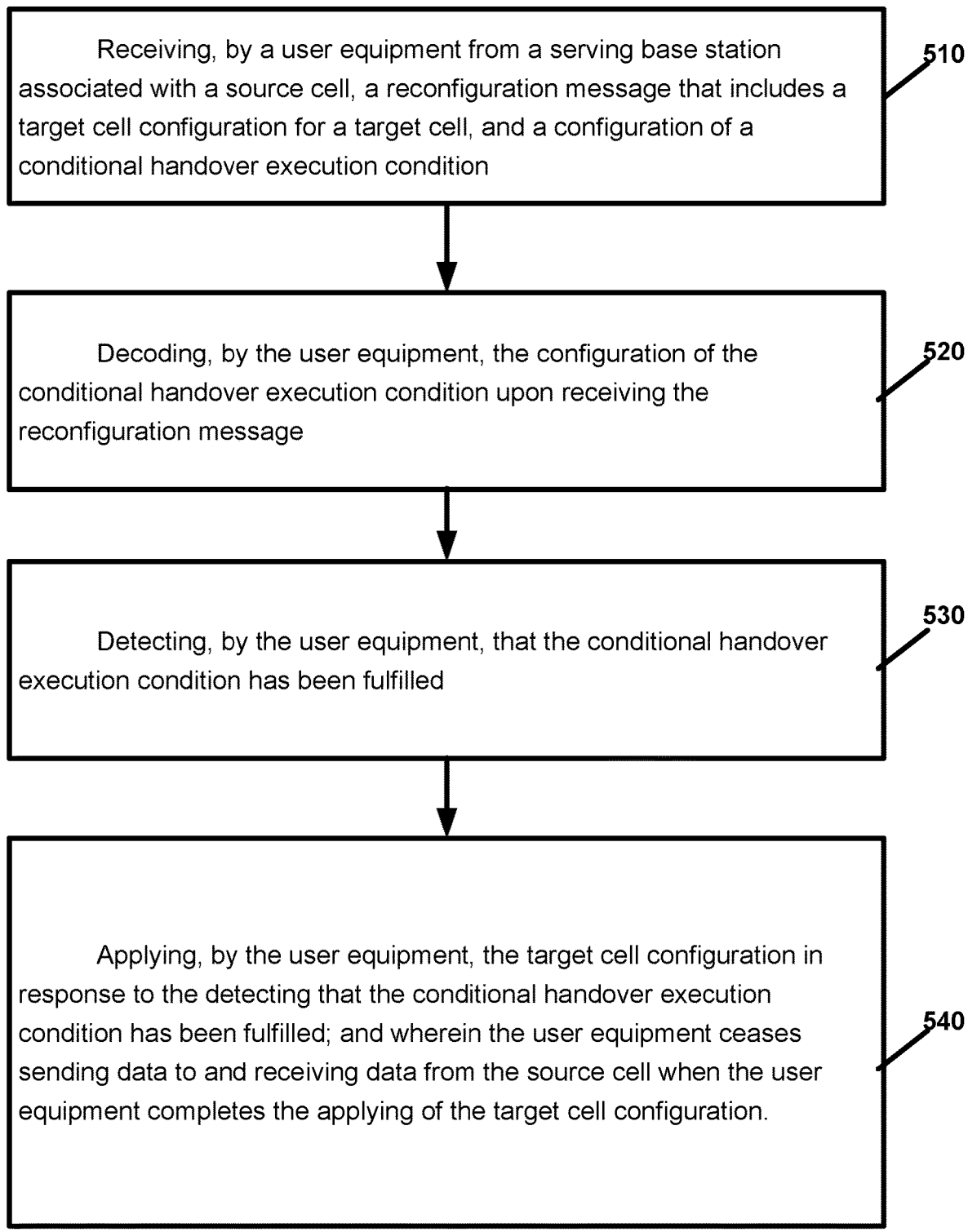
FIG. 5 is a flow chart illustrating operation of a user device/user equipment according to another example embodiment.

Example 17. FIG. 5 is a flow chart illustrating operation of a user equipment (UE) according to another example embodiment. Operation 510 includes receiving, by a user equipment from a serving base station associated with a source cell, a reconfiguration message that includes a target cell configuration for a target cell, and a configuration of a conditional handover execution condition. Operation 520 includes decoding, by the user equipment, the configuration of the conditional handover execution condition upon receiving the reconfiguration message. Operation 530 includes detecting, by the user equipment, that the conditional handover execution condition has been fulfilled. Operation 540 includes applying, by the user equipment, the target cell configuration in response to the detecting that the conditional handover execution condition has been fulfilled; and wherein the user equipment ceases sending data to and receiving data from the source cell when the user equipment completes the applying of the target cell configuration.

Example 18. The method of Example 17, comprising the user equipment receiving data from or sending data to the serving base station until the user equipment completes the applying of the target cell configuration.

Example 19. The method of any of Examples 17-18, wherein the applying of the target cell configuration comprises at least: preparing, by the user equipment based on the target cell configuration, a protocol stack instance for the user equipment to use for communication with the target cell.

Example 20. The method of any of Examples 17-19, further comprising performing at least one of the following: decoding, by the user equipment, the target cell configuration before the conditional handover execution condition is fulfilled; or decoding, by the user equipment, the target cell configuration in response to the detecting that the conditional handover execution condition is fulfilled.

Example 21. The method of any of Examples 17-20 and further comprising performing the following after the user equipment has completed applying the target cell configuration: performing, by the user equipment, synchronization and a random access procedure with respect to the target cell.

Example 22. The method of any of Examples 17-21, further comprising: omitting a transmission, or not sending, by the user equipment, of a reconfiguration complete (e.g., RRC Reconfiguration Complete) as a response to the reconfiguration message when conditional handover execution is triggered immediately upon receiving the reconfiguration message.

Example 23. An apparatus comprising means for performing the method of any of Examples 17-22.

Example 24. A non-transitory computer-readable storage medium comprising instructions stored thereon that, when executed by at least one processor, are configured to cause a computing system to perform the method of any of Examples 17-22.

Example 25. An apparatus comprising: at least one processor; and at least one memory including computer program code; the at least one memory and the computer program code configured to, with the at least one processor, cause the apparatus at least to perform the method of any of Examples 17-22.

Example 26. An apparatus comprising: at least one processor; and at least one memory including computer program code; the at least one memory and the computer program code configured to, with the at least one processor, cause the apparatus at least to: receive, by a user equipment from a serving base station associated with a source cell, a reconfiguration message that includes a target cell configuration for a target cell, and a configuration of a conditional handover execution condition; decode, by the user equipment, the configuration of the conditional handover execution condition upon receiving the reconfiguration message; detect, by the user equipment, that the conditional handover execution condition has been fulfilled; apply, by the user equipment, the target cell configuration in response to the detecting that the conditional handover execution condition has been fulfilled; and wherein the user equipment ceases sending data to and receiving data from the source cell when the user equipment completes the applying of the target cell configuration.

Figure 6:
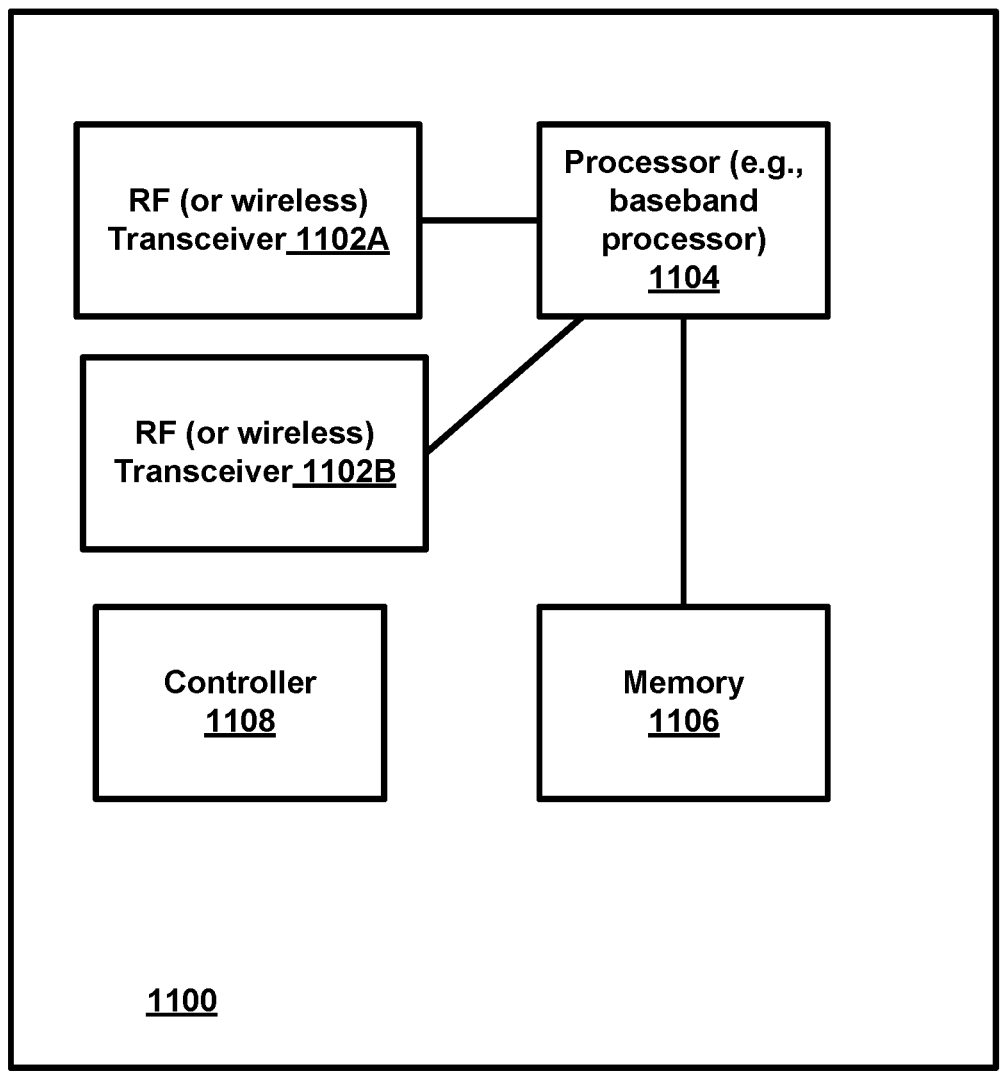
FIG. 6 is a block diagram of a wireless station or wireless node (e.g., AP, BS, gNB, RAN node, relay node, UE or user device, or other node) according to an example embodiment.

FIG. 6 is a block diagram of a wireless station or node (e.g., AP, BS, gNB, eNB, a relay node or other network node, or a user device/UE, or other node) 1100 according to an example embodiment. The wireless station 1100 may include, for example, one or more (e.g., two as shown in FIG. 6) RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 6, a controller (or processor) 1108 may execute software and instructions, and may provide overall control for the station 1100, and may provide control for other systems not shown in FIG. 6, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example embodiment, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (TOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a user equipment from a serving base station associated with a source cell, a reconfiguration message that includes a target cell configuration for a target cell, a configuration of a conditional handover execution condition, and information that indicates that the user equipment should immediately decode and apply the target cell configuration upon receiving the reconfiguration message; and
   immediately decoding and applying, by the user equipment, the target cell configuration upon receiving the reconfiguration message, without waiting for the conditional handover execution condition to be fulfilled, wherein decoding comprises the user equipment evaluating bits or fields within the reconfiguration message to determine a meaning of the bits or of the one or more fields of the reconfiguration message,
   the method further comprising:
   detecting fulfillment of the conditional handover execution condition with respect to the target cell;
   performing, by the user equipment, synchronization and a random access procedure with respect to the target cell, in response to detecting the fulfillment of the conditional handover execution condition,
   receiving data from or sending data to the serving base station until the conditional handover execution condition has been fulfilled.

2. The method of claim 1, wherein the applying of the target cell configuration comprises at least:
   preparing, by the user equipment based on the target cell configuration, a protocol stack instance for the user equipment to use for communication with the target cell, wherein the protocol stack instance includes multiple protocol layers to be used by the user equipment to communicate with the target cell, the multiple protocol layers comprising at least a physical layer, a medium access control layer, a radio link control layer, and a packet data convergence protocol layer,
   wherein the target cell configuration provides configuration information comprising at least the following parameters: a configuration of the medium access control layer for configuring a random access procedure for the target cell and a configuration of the packet data convergence protocol layer for configuration of a security algorithm and a header compression for the target cell.

3. The method of claim 1, further comprising performing the following during at least a portion of a time period when the user equipment performs the immediate decoding and applying of the target cell configuration:
   evaluating whether the conditional handover execution condition has been fulfilled,
   wherein the configuration of the conditional handover execution condition for the target cell includes parameters used by the user equipment to determine the conditional handover execution condition,
   wherein the conditional handover execution condition defines a relationship of a source cell measurement and a target cell measurement among the source cell and the target cell that will trigger the user equipment to perform the handover to the target cell if such conditional handover execution condition is fulfilled or satisfied for a minimum time period,
   the method further comprising:
   the user equipment periodically performing signal measurements of signals received from the source cell and one or more neighbor or potential target cells, wherein the measurements by the user equipment include measuring a reference signal receive power and a reference signal received quality,
   wherein the conditional handover execution condition indicates that the target cell measurement should greater than the source cell measurement by more than an indicated threshold or offset.

4. The method of claim 1, further comprising performing the following during at least a portion of a time period when the user equipment performs the immediate decoding and applying of the target cell configuration:
   receiving data from or sending data to the serving base station.

5. The method of claim 1,
   wherein conditional handover execution for the user equipment is triggered if the condition below is fulfilled for a certain Time-to-Trigger (TTT), where TTT refers to a minimum time period that the conditional handover execution condition must be fulfilled or met to trigger or cause the handover of the UE to the target cell:

$$Mn+Ofn+Ocn-Hys>Mp+Ofp+Ocp+Off$$

where Mn is the measurement of the neighboring target cell of handover, Mp is the measurement of the serving cell, Ocn is the cell individual offset (CIO), and wherein the parameters Ofn, Ofp, Ocp, Off and Hys are other offsets that are indicated in the configuration of conditional handover execution condition,
   wherein the CIO is an offset that applied specifically to target or neighbor cell measurements and specific to this target/neighbor cell.

6. The method of claim 1, wherein the information, included in the reconfiguration message, that indicates that the user equipment should immediately decode and apply the target cell configuration comprises:
   a flag or other explicit indication that the user equipment should immediately decode and apply the target cell configuration upon receiving the reconfiguration message and without waiting for the conditional handover execution condition to be fulfilled with respect to the target cell.

7. The method of claim 1, wherein the information, included in the reconfiguration message, that indicates that the user equipment should immediately decode and apply the target cell configuration comprises:
- an implicit indication that the user equipment should immediately decode and apply the target cell configuration without waiting for the conditional handover execution condition to be fulfilled.

8. The method of claim 7 wherein the implicit indication comprises:
- one or more fields or parameters of the configuration of the conditional handover execution condition that causes the user equipment to perform the immediate decoding and applying of the target cell configuration upon receiving the reconfiguration message, and without waiting for the conditional handover execution condition to be fulfilled with respect to the target cell.

9. The method of claim 7 wherein the implicit indication comprises:
- a cell individual offset, or other offset, set to a value that causes the user equipment to perform the immediate decoding and applying of the target cell configuration upon receiving the reconfiguration message.

10. The method of claim 1 wherein the configuration of the conditional handover execution condition comprises a time-to-trigger value that is long enough to allow a sufficient time period for the user equipment to decode and apply the target cell configuration before the conditional handover execution condition is fulfilled,
- wherein the method further comprises:
- preparing, by the user equipment based on the target cell configuration, a protocol stack instance for the user equipment to use for communication with the target cell,
- wherein after the conditional handover execution condition has been met for a time-to-trigger time period, the handover of the user equipment from the source cell to the target cell is triggered, wherein the handover of the user equipment includes the user equipment detaching from the source cell, wherein the user equipment stops receiving and/or decoding signals from the source cell, stops receiving or acquiring synchronization signals from the source cell, and stops transmitting data to and/or receiving data from the source cell,
- wherein the user equipment, as part of the handover to the target cell after detaching from the source cell, performs layer 1/layer 2 synchronization to the target cell, by receiving primary synchronization signals and secondary synchronization signals from the target cell to obtain frame timing information for the target cell then performing a random access procedure with the target cell, where the synchronization and/or random access procedure performed by the user equipment with respect to the target cell is performed based on or using the prepared protocol stack instance that was previously prepared by the user equipment based on the target cell configuration.

11. The method of claim 1, further comprising:
- omitting a transmission, or not sending, by the user equipment, of a reconfiguration complete as a response to the reconfiguration message when receiving a reconfiguration message that includes information that indicates that the user equipment should immediately decode and apply the target cell configuration upon receiving the reconfiguration message.

12. An apparatus comprising:
- at least one processor; and
- at least one non-transitory memory including computer program code;
- the at least one memory and the computer program code configured to, with the at least one processor, cause the apparatus at least to perform the method of claim 1.

13. A method comprising:
- receiving, by a user equipment from a serving base station associated with a source cell, a reconfiguration message that includes a target cell configuration for a target cell, and a configuration of a conditional handover execution condition;
- decoding, by the user equipment, the configuration of the conditional handover execution condition upon receiving the reconfiguration message;
- detecting, by the user equipment, that the conditional handover execution condition has been fulfilled;
- applying, by the user equipment, the target cell configuration in response to the detecting that the conditional handover execution condition has been fulfilled; and
- wherein the user equipment ceases sending data to and receiving data from the source cell when the user equipment completes the applying of the target cell configuration,
- the method further comprising performing the following after the user equipment has completed applying the target cell configuration:
- performing, by the user equipment, synchronization and a random access procedure with respect to the target cell;
- decoding, by the user equipment, the target cell configuration before the conditional handover execution condition is fulfilled; and
- decoding, by the user equipment, the target cell configuration in response to the detecting that the conditional handover execution condition is fulfilled.

14. The method of claim 13, comprising the user equipment receiving data from or sending data to the serving base station until the user equipment completes the applying of the target cell configuration.

15. The method of claim 13, wherein the applying of the target cell configuration comprises at least:
- preparing, by the user equipment based on the target cell configuration, a protocol stack instance for the user equipment to use for communication with the target cell.

16. The method of claim 13, further comprising:
- omitting a transmission, or not sending, by the user equipment, of a reconfiguration complete as a response to the reconfiguration message when conditional handover execution is triggered immediately upon receiving the reconfiguration message.

17. An apparatus comprising:
- at least one processor; and
- at least one non-transitory memory including computer program code;
- the at least one memory and the computer program code configured to, with the at least one processor, cause the apparatus at least to perform the method of claim 13.

* * * * *